United States Patent [19]

Mosley et al.

[11] Patent Number: 5,442,902
[45] Date of Patent: Aug. 22, 1995

[54] ROTARY MOWER HAVING INTEGRATED DEFLECTOR/MULCHING PLUG AND IMPROVED BLADE

[75] Inventors: Keith A. Mosley, Jackson; Kent H. Elrod, Humbolt, both of Tenn.

[73] Assignee: Murray, Inc., Brentwood, Tenn.

[21] Appl. No.: 217,137

[22] Filed: Mar. 23, 1994

[51] Int. Cl.⁶ .................. A01D 34/73; A01D 34/82
[52] U.S. Cl. .................. 56/17.5; 56/295; 56/320.2
[58] Field of Search .............. 56/17.5, 295, 320.2, 56/202

[56] References Cited

U.S. PATENT DOCUMENTS

| | | | |
|---|---|---|---|
| 2,983,096 | 5/1961 | Phelps | 56/255 |
| 3,706,190 | 12/1972 | Taub | 56/13.4 |
| 3,805,499 | 4/1974 | Woelffer et al. | 56/202 |
| 3,919,832 | 11/1975 | Christopherson | 56/320.2 |
| 4,031,694 | 6/1977 | Gobin | 56/202 |
| 4,047,367 | 9/1977 | Thorud | 56/320.2 X |
| 4,135,351 | 1/1979 | Akgulian | 56/255 |
| 4,258,539 | 3/1981 | Pearce et al. | 56/320.2 X |
| 4,312,174 | 1/1982 | Vanderhoef | 56/320.2 |
| 4,326,370 | 4/1982 | Thorud | 56/202 |
| 4,435,949 | 3/1984 | Heismann | 56/320.2 |
| 4,559,769 | 12/1985 | Seyerle | 56/295 |
| 4,726,178 | 2/1988 | Mallaney et al. | 56/202 |
| 5,048,279 | 9/1991 | Badawey et al. | 56/320.2 |
| 5,090,183 | 2/1992 | Thorud et al. | 56/320.2 X |
| 5,094,065 | 3/1992 | Azbell | 56/295 X |
| 5,094,066 | 3/1992 | McBride et al. | 56/295 |
| 5,191,756 | 3/1993 | Kuhn | 56/17.5 |
| 5,284,006 | 2/1994 | Sheldon | 56/255 |
| 5,337,545 | 8/1994 | Butler | 56/320.2 |

FOREIGN PATENT DOCUMENTS 1584495  2/1981  United Kingdom .

*Primary Examiner*—George A. Suchfield
*Attorney, Agent, or Firm*—Cushman Darby & Cushman

[57] ABSTRACT

A rotary lawn mower specially adapted for selectively mulching and/or discharging grass clippings. The preferred embodiment comprises a lawn mower having a generally conventional cutting deck, with an integrated discharge chute/mulching plug hingedly secured to the deck adjacent the discharge opening. The integrated discharge chute/mulching plug is selectively movable between a plurality of positions, including a mulch position and a discharge position. In the mulch position, the inner wall of the plug member extends within the discharge chute to establish a generally continuous inner wall within the cutting chamber for improved mulching performance. The mower further includes an improved cutting blade, having a pair of raised rib sections intermediate the cutting edges and the central hub, the raised ribs being operative to create an additional upward air flow component to improve circulation during both mulching and discharging. Two embodiments of the integrated discharge chute/mulching plug are disclosed, having different locking mechanisms for securing the plug in its various positions.

19 Claims, 10 Drawing Sheets

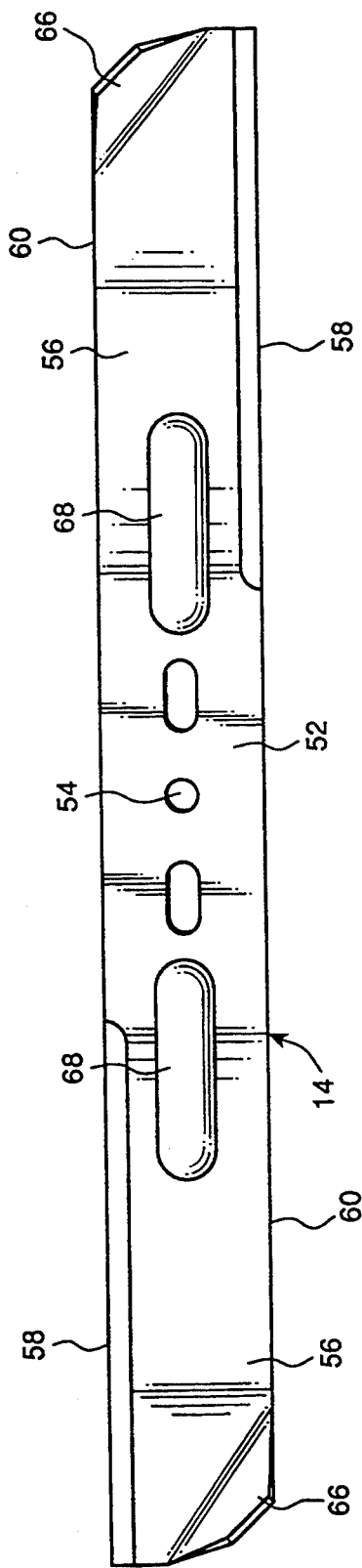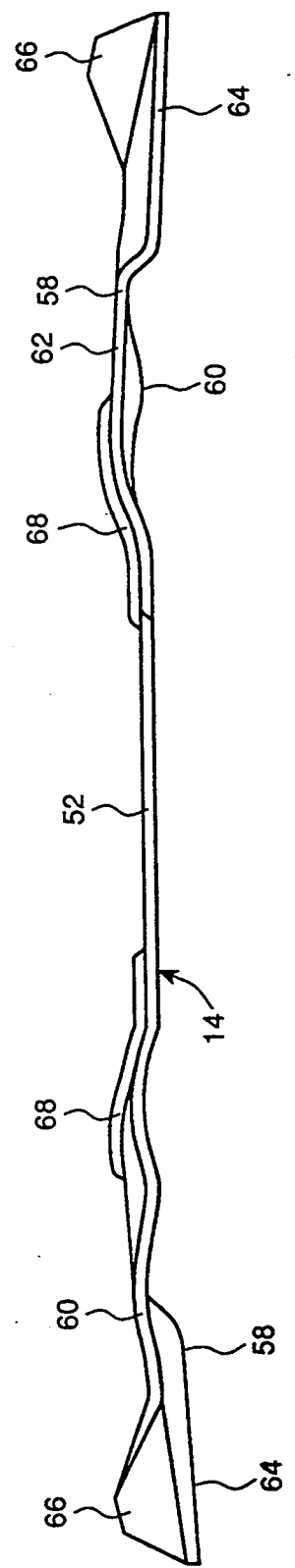

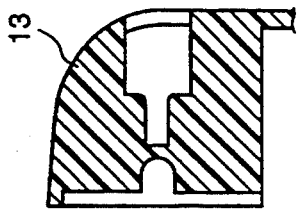
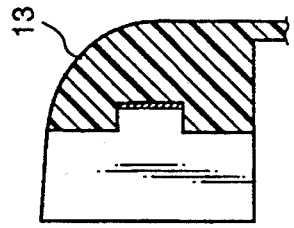
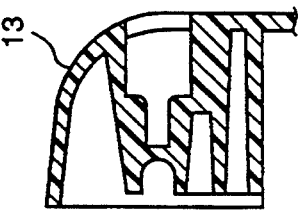
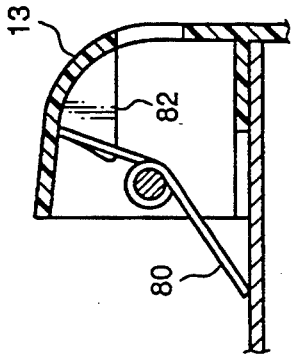
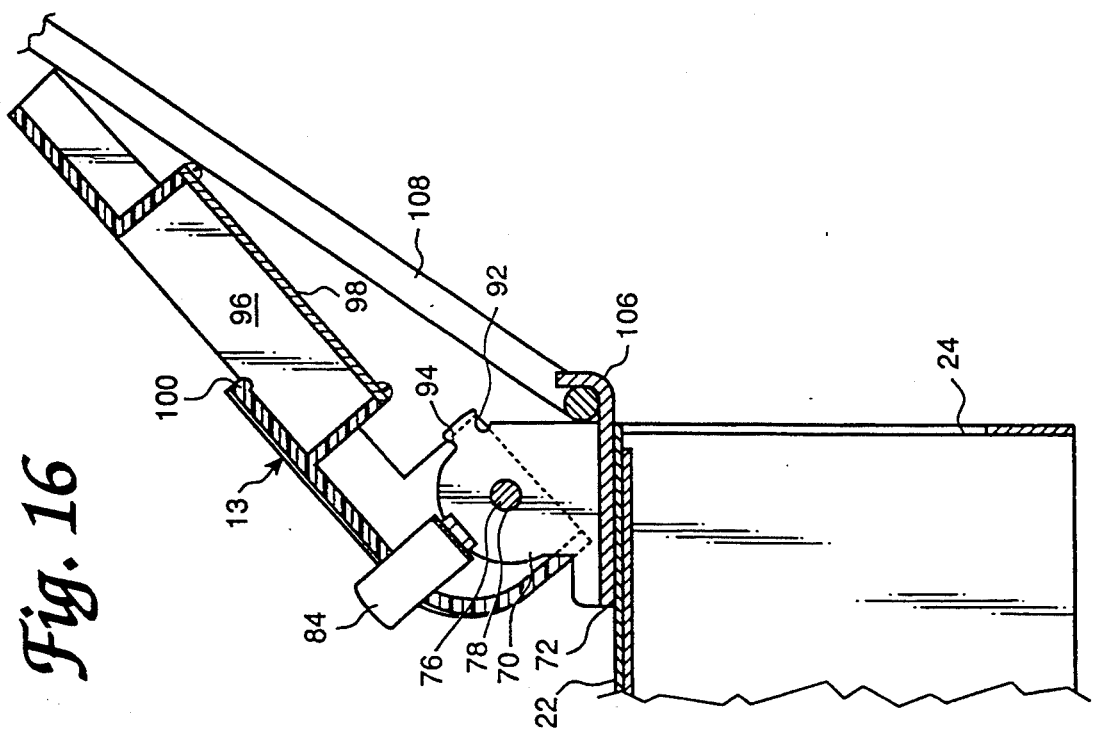

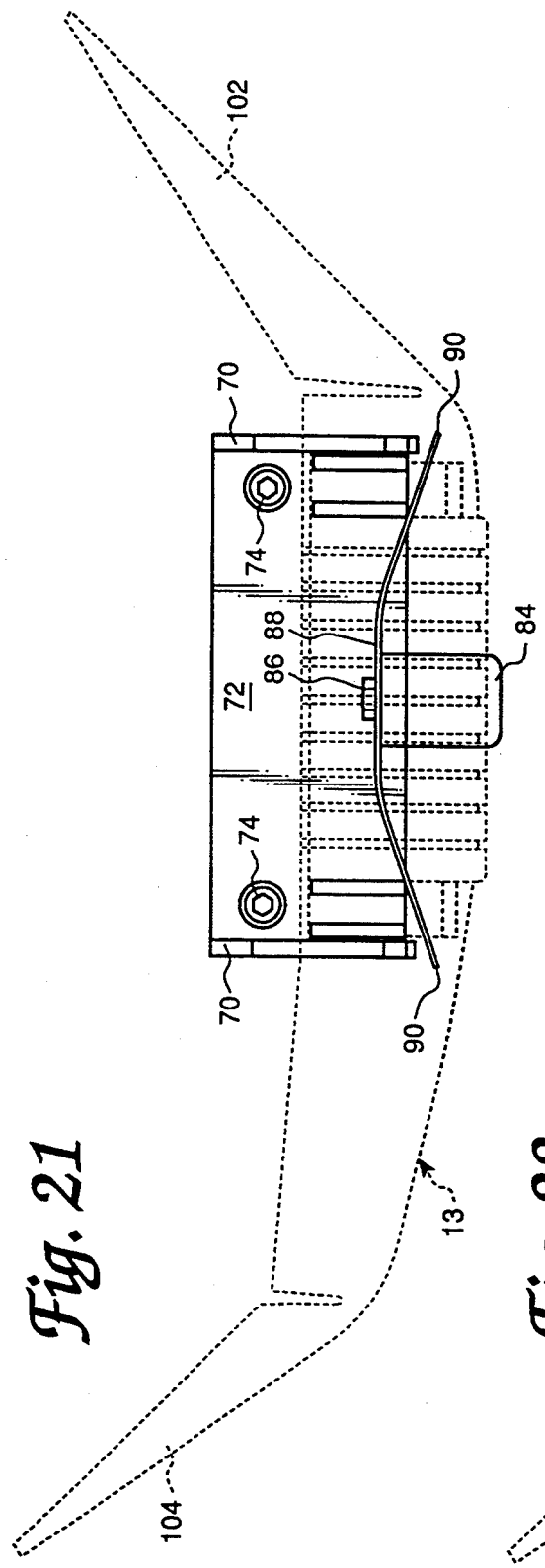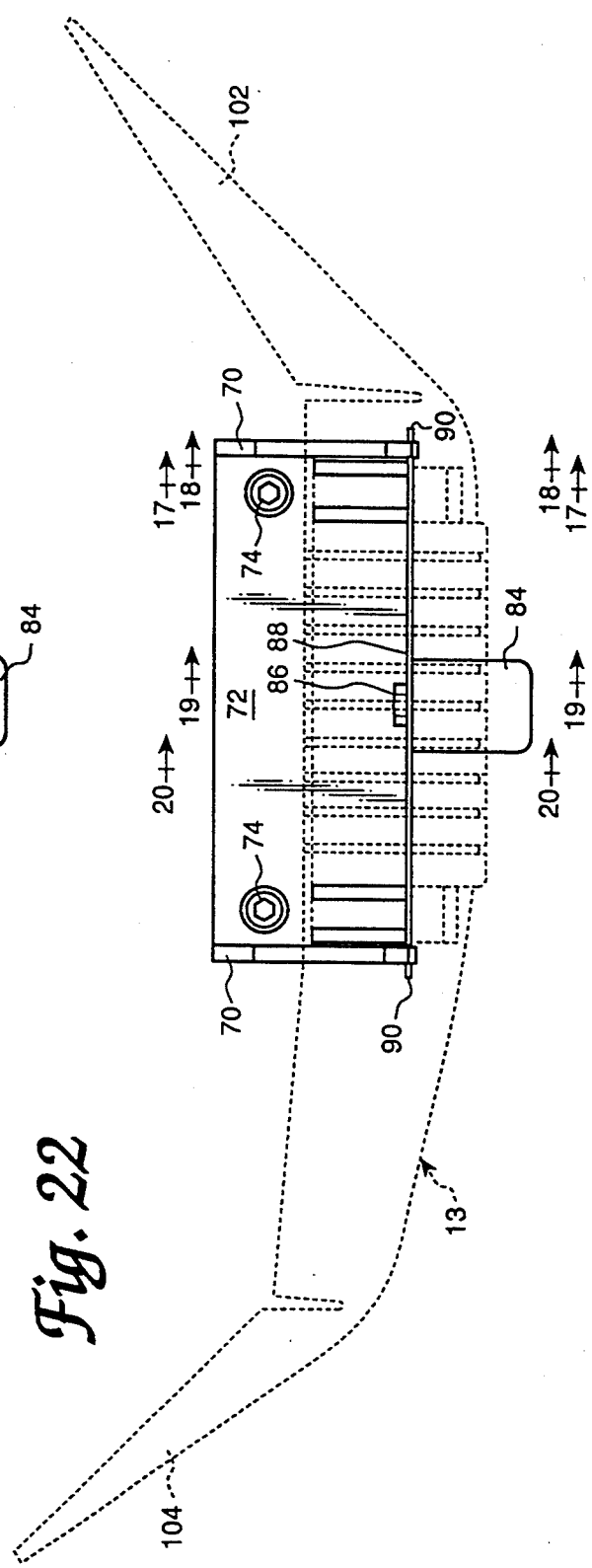

ROTARY MOWER HAVING INTEGRATED DEFLECTOR/MULCHING PLUG AND IMPROVED BLADE

BACKGROUND OF THE INVENTION

1. Field

The present invention relates to rotary lawn mowers and, more particularly, to such mowers specially adapted for both mulching and discharging grass clippings.

2. Description of the Prior Art

It is generally well known in the lawn mower industry that a rotary mower designed to discharge grass clippings is typically not efficient for use in mulching. Similarly, it is known that a mower designed specifically to mulch grass clippings is typically less effective for discharging and/or bagging the clippings. Numerous attempts have been made to convert a discharge-type mower to a mulching mower, as evidenced by the following U.S. Pat. Nos. 2,983,096, issued May 9, 1961 to Phelps; 3,706,190, issued Dec. 19, 1972 to Taub; 4,135,351, issued Jan. 23, 1979 to Akgulian; 4,312,174, issued Jan. 26, 1982 to Vanderhoef; 4,326,370, issued Apr. 27, 1982 to Thorud; 4,435,949, issued Mar. 13, 1984 to Heismann; 4,726,178, issued Feb. 23, 1988 to Mallaney, et al.; 5,048,279, issued Sep. 17, 1991 to Badawey, et al.; and 5,090,183, issued Feb. 25, 1992 to Thorud, et al.

In each of the above-cited patents, a compromise must be made in either convenience or performance, or both. In particular, prior art mowers adapted for both mulching and discharging grass clippings typically require additional components to be bolted or otherwise secured to the cutting deck to convert the mower for use in mulching. Such additional components must be removed and stored when not in use. With regard to performance, most prior art mowers adapted to mulch and discharge typically perform both functions less efficiently than mowers dedicated to one function or the other. Due to the shape of the cutting chamber and configuration of the blade, mowers which provide superior mulching capabilities typically are not well suited for discharging grass clippings, and vice versa. Accordingly, a need has been recognized for a single mower which may be easily and conveniently converted from discharging to mulching, and which performs both functions in a superior manner.

BRIEF SUMMARY OF THE INVENTION

It is, therefore, an object of the present invention to provide a rotary lawn mower which is easily convertible between mulching and discharging functions.

It is another object to provide a mower having a blade which is well suited for either discharging or mulching grass clippings.

In order to achieve these and other objectives, the present invention comprises a rotary lawn mower having a generally conventional cutting deck with a unique, integrated mulching plug/discharge deflector hingedly secured to the discharge opening. The plug may be locked in either a mulching position or a discharge position simply by disengaging a hand-operated locking mechanism and pivoting the plug to its desired position. When in its mulching position, an inner wall surface of the plug fits within the discharge chute of the cutting deck to provide a generally continuous peripheral wall within the cutting chamber for improved mulching. When set in its discharge position, the plug serves as an effective deflector for directing grass clippings outwardly onto the lawn. The plug may also be moved to a bagging position, thereby accommodating a conventional grass collection bag.

The mower of this invention also includes a unique cutting blade which provides both superior mulching and superior discharging capabilities. As with most conventional mulching blades, the blade of this invention includes an outer cutting surface and an inner, elevated cutting surface on its leading edge, and an upturned corner at the distal end of its trailing edge. The blade of this invention also includes a unique raised rib intermediate the second elevated cutting surface and the hub, which provides an additional updraft for improving the blade's mulching and discharging capabilities.

Additional objects and advantages of this invention will become apparent upon reading the attached detailed description and upon reference to the appended drawings.

BRIEF DESCRIPTION OF THE DRAWINGS

FIG. 3 is a top plan view of the cutting blade of the present invention;

FIG. 4 is a side elevational view of the cutting blade shown in FIG. 3;

FIG. 16 is a side sectional view through the alternative embodiment shown in FIG. 14, showing the mulching plug/discharge deflector raised to accommodate a bag for collecting grass clippings;

FIG. 17 is a sectional view through the hinge portion of the alternative embodiment of the mulching plug/discharge deflector, taken along line 17—17 of FIG. 22;

FIG. 18 is a sectional view through the hinge portion of the alternative embodiment of the mulching plug/discharge deflector, taken along line 18—18 of FIG. 22;

FIG. 19 is a sectional view through the hinge portion of the alternative embodiment of the mulching plug/discharge deflector, taken along line 19—19 of FIG. 22;

FIG. 20 is a sectional view through the hinge portion of the alternative embodiment of the mulching plug/discharge deflector, taken along line 20—20 of FIG. 22;

FIG. 21 is a top plan view of the alternative embodiment mulching plug/discharge deflector, showing the locking mechanism in its unlocked position; and FIG. 22 is a top plan view of the alternative embodiment similar to FIG. 21, showing the locking mechanism in its locked position.

DETAILED DESCRIPTION OF THE PREFERRED EMBODIMENT

Figure 1:
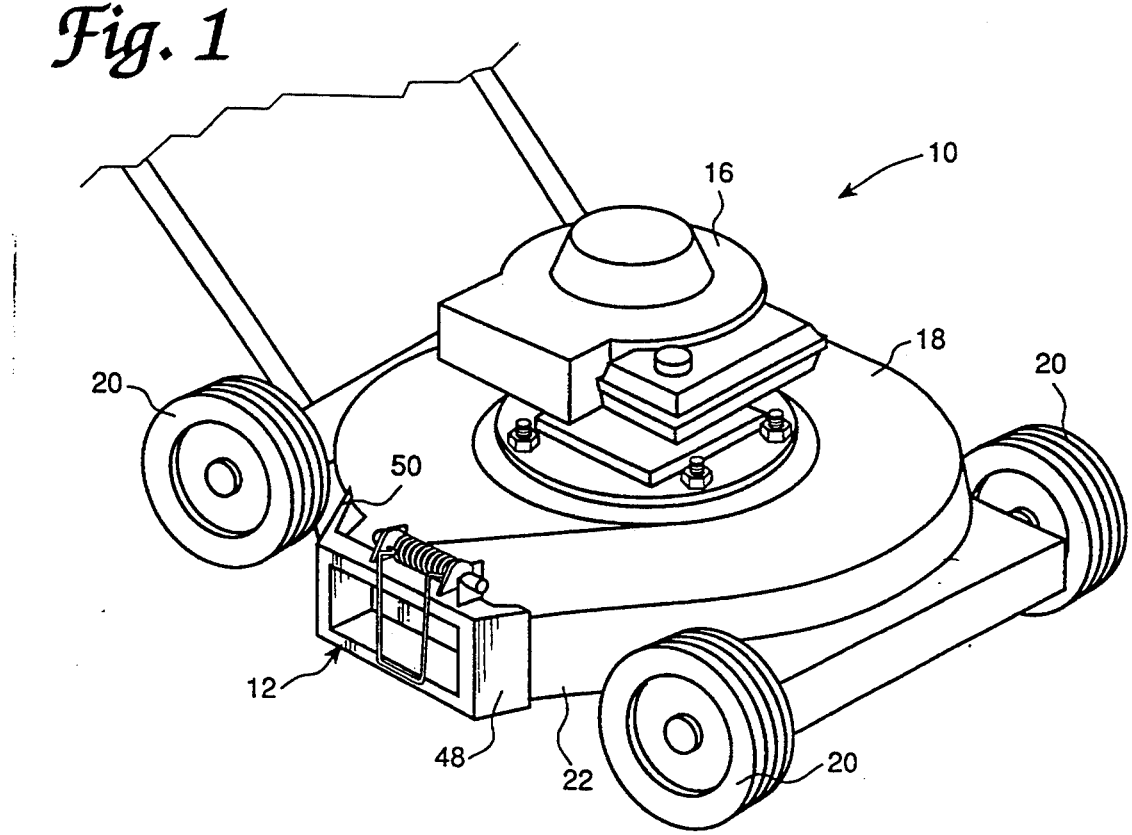
FIG. 1 is a top, side perspective view of the mower of the present invention, with the mulching plug/discharge deflector in its mulch position.
Figure 2:
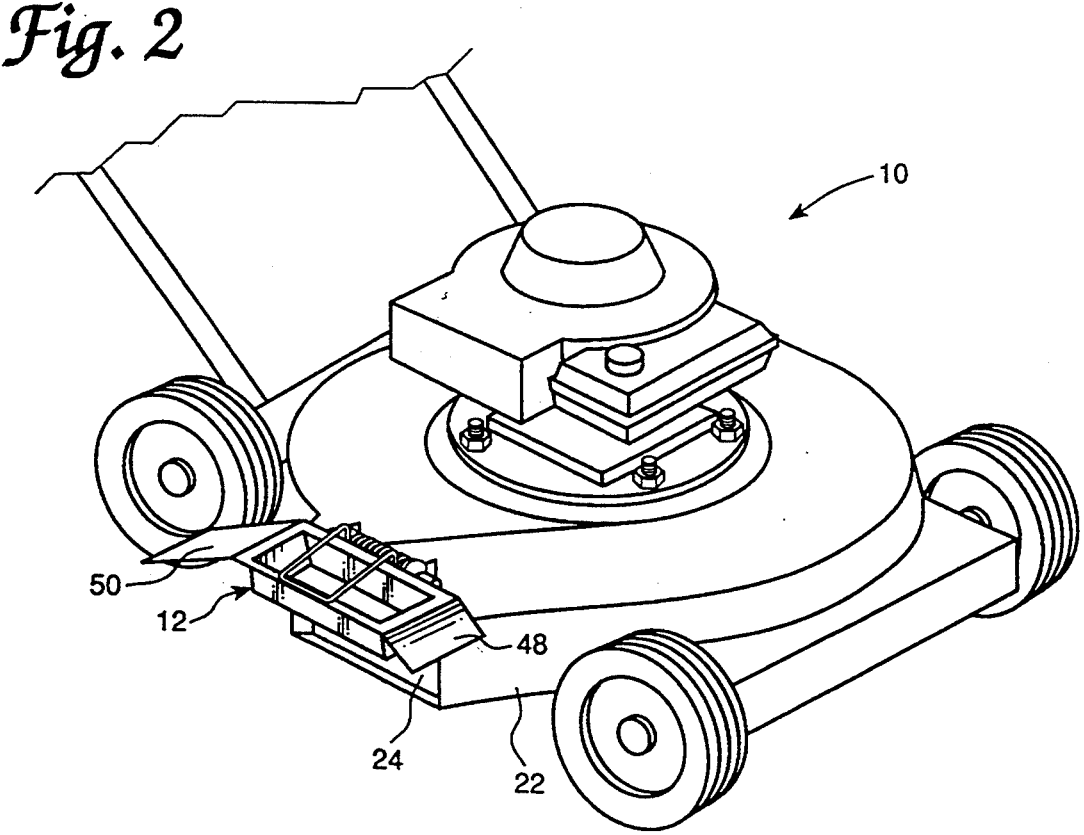
FIG. 2 is a top, side perspective view similar to FIG. 1, showing the mulching plug/discharge deflector in its discharge position.

The principles of the present invention are embodied in lawn mower 10, shown generally in FIGS. 1 and 2. The unique features and advantages of the present invention lie primarily in the characteristics of cutting blade 14 and the integrated mulching plug/discharge deflector and its related mounting hardware, the two embodiments disclosed herein being referred to as plug 12 and plug 13. Those skilled in the art will readily understand that the remaining components of mower 10 are generally conventional, and their detailed description is unnecessary for purposes of understanding and reproducing the invention disclosed herein.

Mower 10 comprises a conventional engine 16 suitably bolted or otherwise secured to cutting deck 18, which is conventionally supported by four wheels 20. Cutting deck 18 has a discharge chute 22 formed therein, which serves to direct grass clippings laterally and outwardly through discharge opening 24. In the first embodiment shown in FIGS. 9–13, plug 12 is mounted to the top surface of discharge chute 22 adjacent discharge opening 24, as described more fully hereinbelow.

A pair of spaced apart brackets 26 are fixedly secured to discharge chute 22 of cutting deck 18 by riveting, bolting, welding or other suitable means. For simplicity, brackets 26 may be formed from a single piece of sheet metal fastened to chute 22, rather than comprising separate components. Plug 12 includes a pair of upstanding ears 28 integrally formed along its upper edge, with ears 28 being positioned to fit between brackets 26 and closely adjacent thereto. Shaft 30 extends transversely through ears 28, its opposite ends engaging holes 32 formed in brackets 26, thereby comprising a hinge wherein shaft 30 defines an axis about which plug 12 is free to rotate. Torsion spring 34 is operatively disposed along a portion of the length of shaft 30, having opposite ends bearing on plug 12 and the top of discharge chute 22 to bias plug 12 in its closed, or mulch, position.

Figure 12:
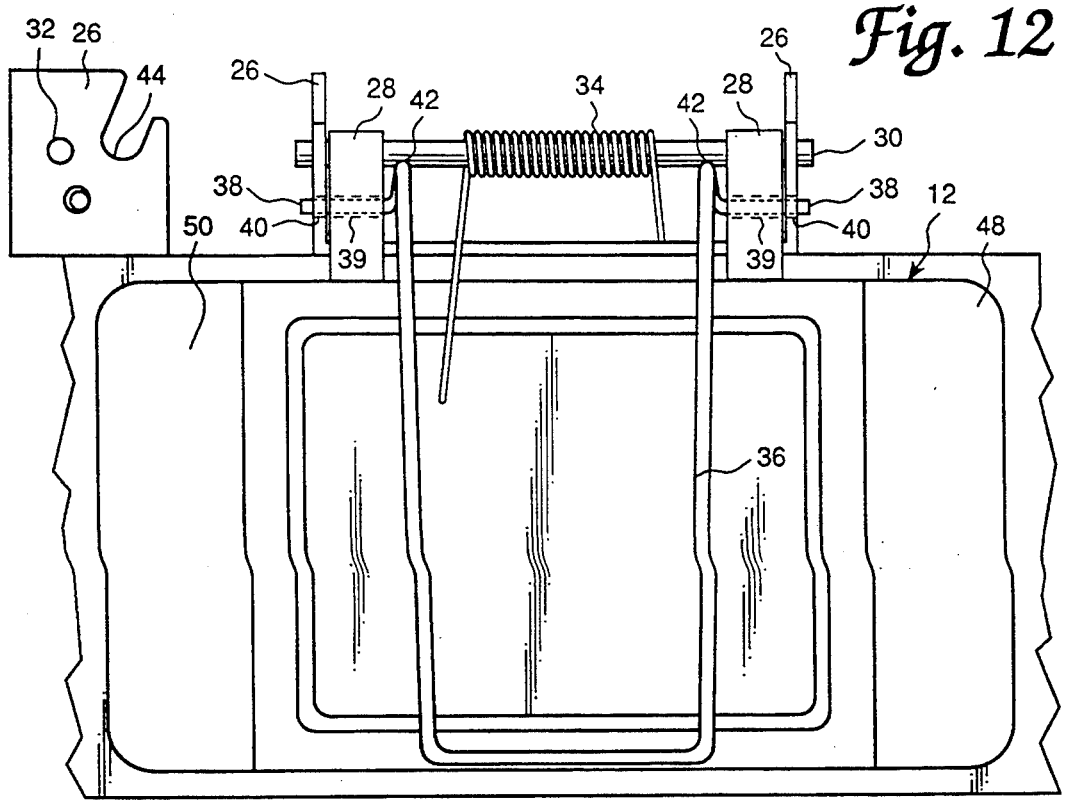
FIG. 12 is an end elevational view of the discharge chute, showing the mulching plug/discharge deflector locked in its mulch position.
Figure 13:
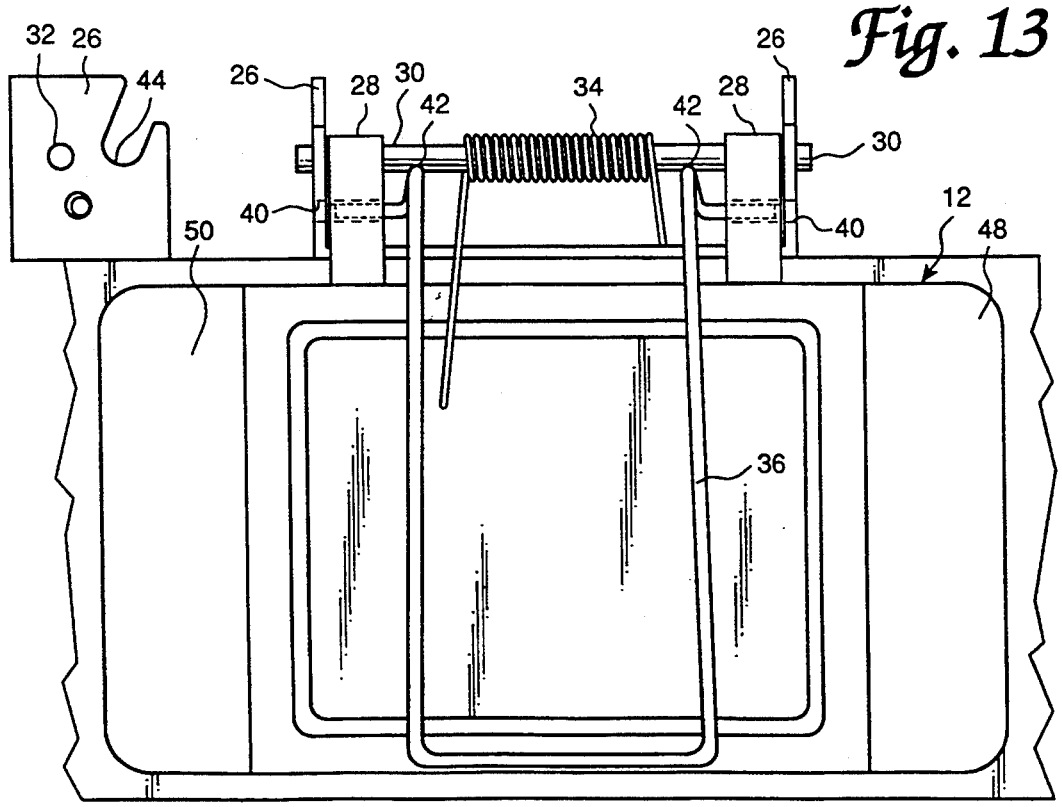
FIG. 13 is an end elevational view similar to FIG. 12, showing the retaining wire in its compressed, unlocked position.

Plug 12 is selectively securable in either its mulch position, as shown in FIG. 1, or its discharge position, as shown in FIG. 2. As best shown in FIGS. 12 and 13, bail wire 36 is provided in the first embodiment disclosed herein for securing plug 12 in either its mulch or discharge position. As shown, bail wire 36 comprises a generally U-shaped member, having opposite ends 38 retained within suitable holes 39 formed through ears 28 extending from the upper edge of plug 12.

With plug 12 locked in its mulch position, ends 38 of bail wire 36 are secured within holes 40 in brackets 26. Bail wire 36 preferably includes a pair of protrusions 42 which may be easily grasped by the user, as between the thumb and forefinger, and squeezed to retract ends 38 slightly, thereby disengaging holes 40 to unlock plug 12 as shown in FIG. 13. Plug 12 is then free to be moved to either the discharge position shown in FIG. 10 or the bagging position shown in FIG. 11. When set in the discharge position, ends 38 extend to engage receptacles 44 formed in brackets 26. When secured in its discharge position, plug 12 forms suitable upper and side extensions of discharge opening 24 for more effectively directing the outward flow of grass clippings onto the ground. Ends 38 engage receptacles 44 to prevent inadvertent closing of plug 12, but, due to the slotted configuration of receptacles 44, do not prevent further upward movement of plug 12 when necessary to allow passage of a large item, such a stick, outwardly through discharge opening 24.

Figure 9:
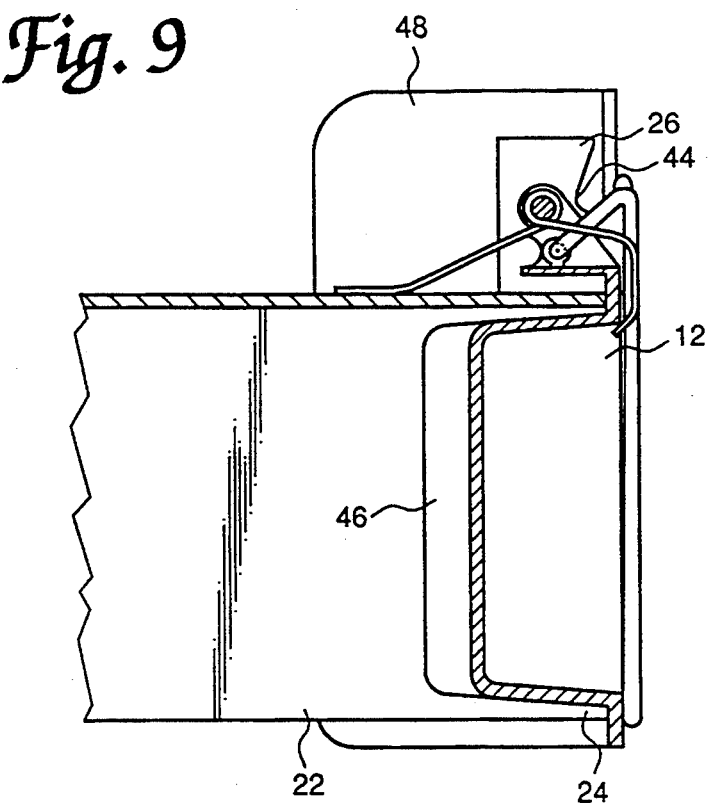
FIG. 9 is a side sectional view through the discharge chute of the present invention, showing the mulching plug/discharge deflector in its mulch position.
Figure 10:
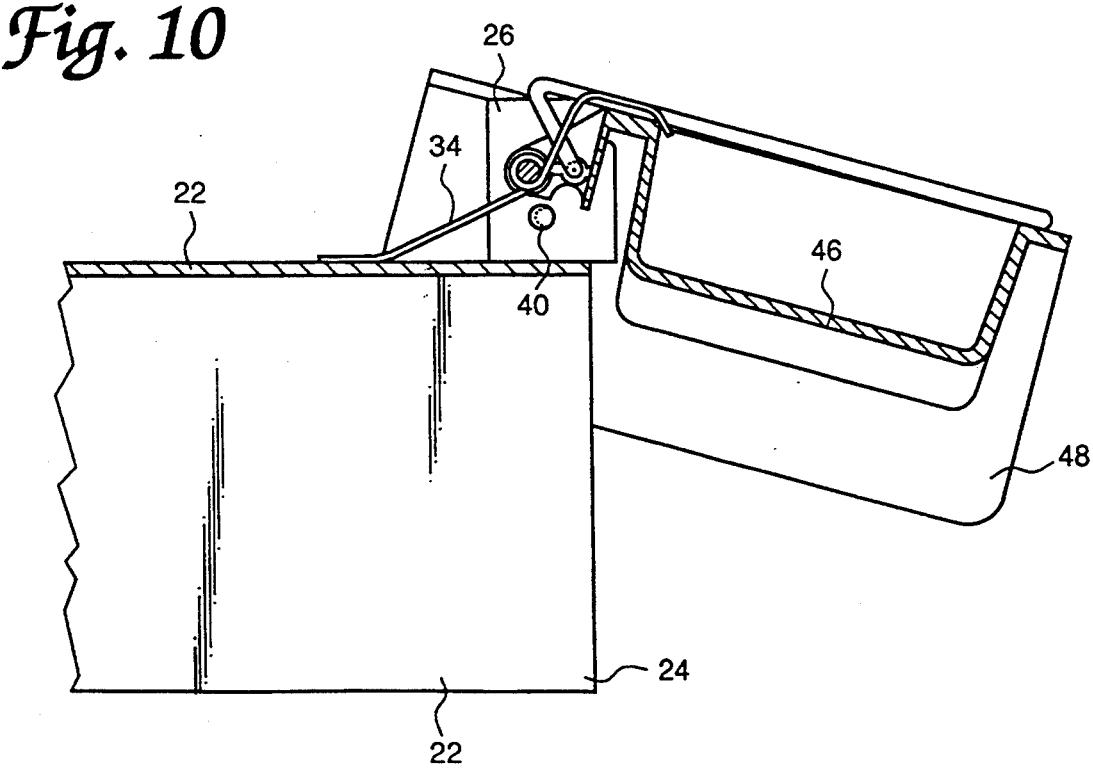
FIG. 10 is a side sectional view similar to FIG. 9, showing the mulching plug/discharge deflector in its discharge position.
Figure 11:
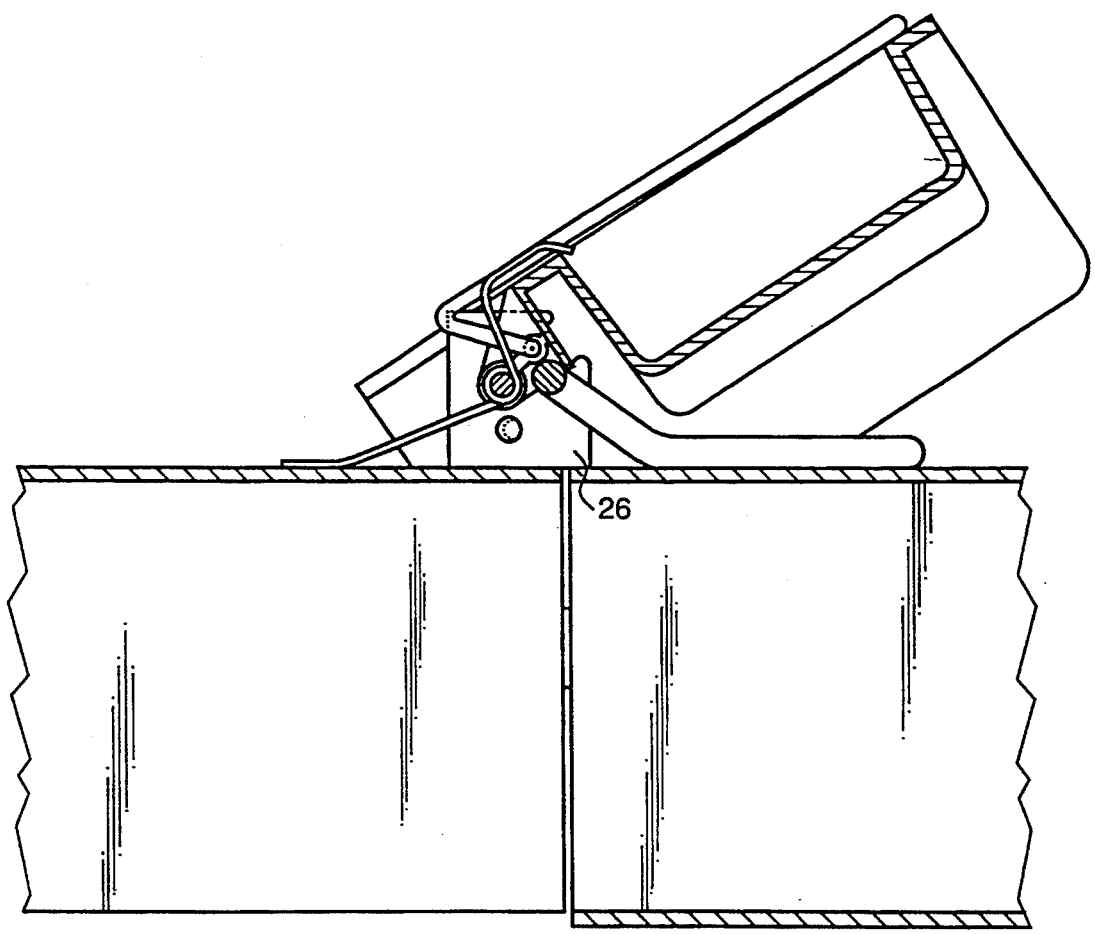
FIG. 11 is a side sectional view similar to FIGS. 9 and 10, showing the mulching plug/discharge deflector raised to accommodate a bag for collecting grass clippings.

One of the unique characteristics of plug 12 is the concave body having a recessed inner wall 46, inwardly offset from the face of plug 12. As shown in FIG. 9, when plug 12 is in its mulch position inner wall 46 extends through discharge opening 24 well within discharge chute 22, thereby forming a generally continuous peripheral surface about the interior of cutting deck 18 to improve the mulching function of mower 10. As those skilled in the art will appreciate, the ideal shape for a mulching cutting deck is a chamber having a continuous, circular inner wall surface. The addition of a discharge chute, such as discharge chute 22, generally disrupts the preferred air flow for optimum mulching. Inner wall 46 of plug 12 compensates for the addition of discharge chute 22 to create a more ideal mulching chamber within cutting deck 18.

When it is desirable to discharge grass clippings, plug 12 is easily moved to its discharge position, wherein inner wall 46 forms an effective upper surface for directing grass clippings outwardly and downward onto the grass. Additional unique features of plug 12 further improve its function in discharging grass clippings. As best shown in FIGS. 1 and 2, front extension 48 and rear extension 50 are integrally formed with the front and rear edges of the face of plug 12, and cooperate with inner wall 46 to improve the function of plug 12, particularly when used in the discharge mode. Extensions 48 and 50 assist in deflecting grass clippings outwardly and downwardly away from cutting deck 18 when set in the discharge position. Rear extension 50, in particular, assists in preventing clippings from being projected towards the user. With plug 12 in its mulch position, extensions 48 and 50 cooperate with the upper, lower, front, and rear edges of the face of plug 12 to assist in effectively sealing discharge opening 24 to prevent unwanted discharge therethrough and improve air flow within cutting deck 18.

The unique configuration of cutting blade 14 represents an improvement which significantly contributes to the dual purpose performance of mower 10. As shown in FIGS. 3 and 4, blade 14 comprises a generally conventional central hub 52 having a hole 54 therethrough for attachment to a rotating shaft driven by engine 16. Projecting outwardly from hub 52 are a pair of identical blade sections 56, each comprising a leading edge 58 and a trailing edge 60. Leading edge 58 is sharpened for cutting, and is formed with an elevated section 62 and a lower section 64. Each trailing edge 60 includes an upturned corner 66.

With plug 12 in its mulch position, upturned corners 66 cooperate with elevated sections 62 and lower sections 64 of leading edges 58 during rotation of cutting blade 14 to create an air flow within cutting chamber 18 suitable for mulching. With plug 12 in either its discharge or bag position, the dominant air flow pattern is created by upturned corners 66, and is essentially upward and radially outward to effect the efficient discharge of grass clippings.

Figure 5:
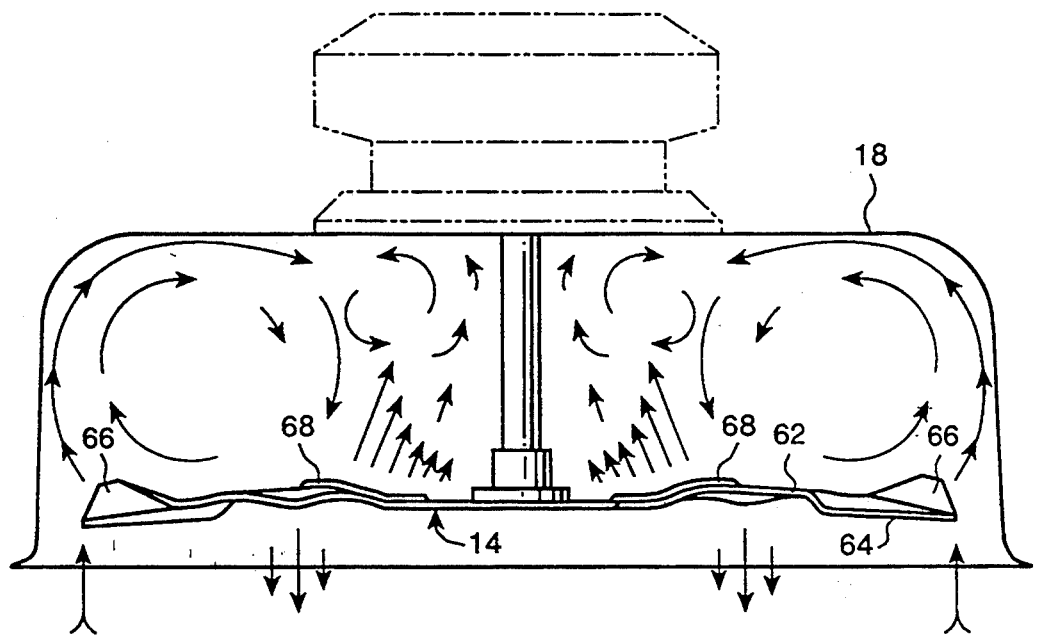
FIG. 5 is a side sectional view through the cutting deck of the mower shown in FIG. 1, on an enlarged scale, illustrating the air flow pattern during mulching.
Figure 6:
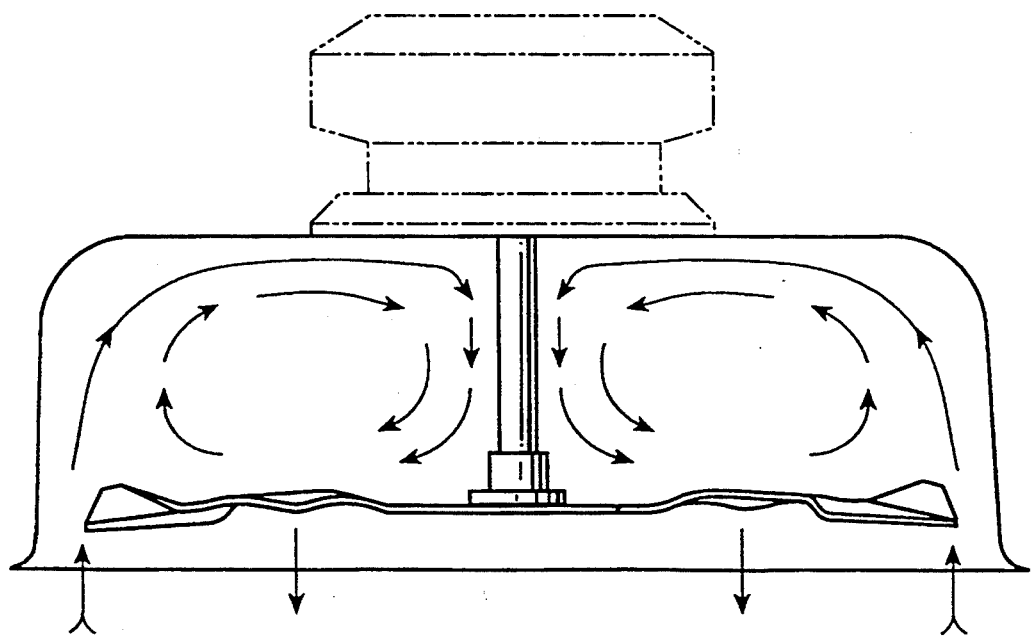
FIG. 6 is a side sectional view similar to FIG. 5, showing the air flow pattern of a conventional mulching blade.
Figure 7:
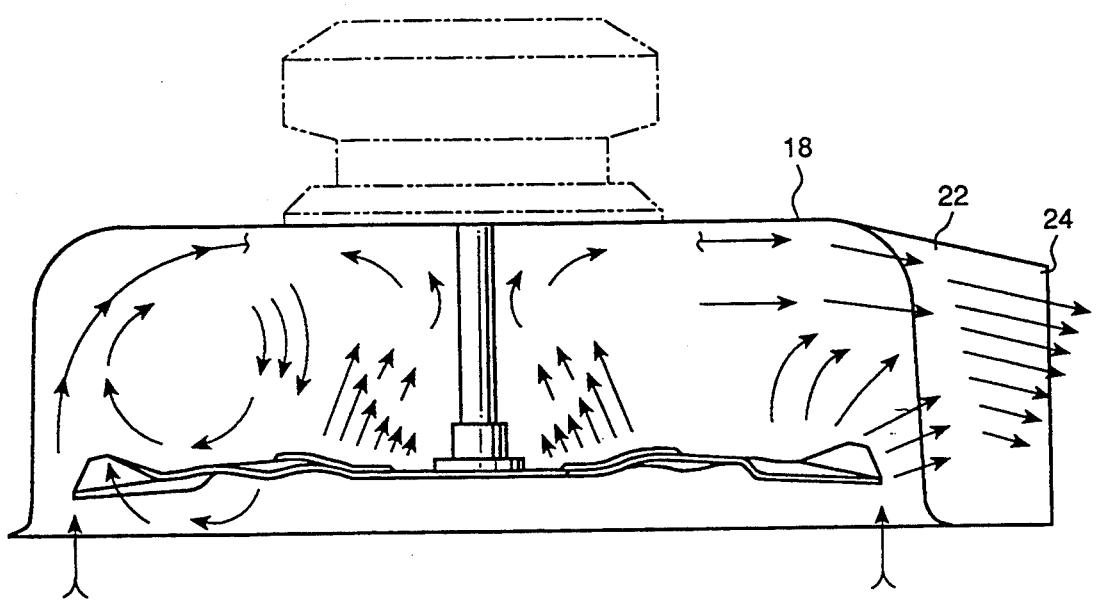
FIG. 7 is a side sectional view similar to FIG. 5, showing the air flow pattern during discharging.

Cutting blade 14 includes a unique feature which enhances the above described air flow patterns to improve the performance of mower 10 in both the mulch and discharge modes. Disposed between intermediate hub 52 and the distal ends of blade sections 56 are a pair of raised ribs 68. During rotation of cutting blade 14, ribs 68 create an additional upward component to the air flow within cutting deck 18, as shown in FIGS. 5 and 7. The efficiency of any mulching mower is determined, in part, by the ability to recirculate grass clippings within the cutting deck after the initial cut. Such recirculation allows the blade to cut each clipping multiple times, with each subsequent cut reducing the size of the clipping. With cutting blade 14, grass is initially cut primarily by lower sections 64, with subsequent cuts being performed primarily by elevated sections 62; most conventional mulching blades operate in a similar manner in this respect. With cutting blade 14, however, the additional circulation of grass clippings resulting from the unique air flow caused by ribs 68 increases the number of cuts imparted on each clipping, thereby yielding a finer grade of mulched clippings. A comparison of the air flow patterns created by cutting blade 14 and a conventional mulching blade is shown in FIGS. 5 and 6.

Figure 8:
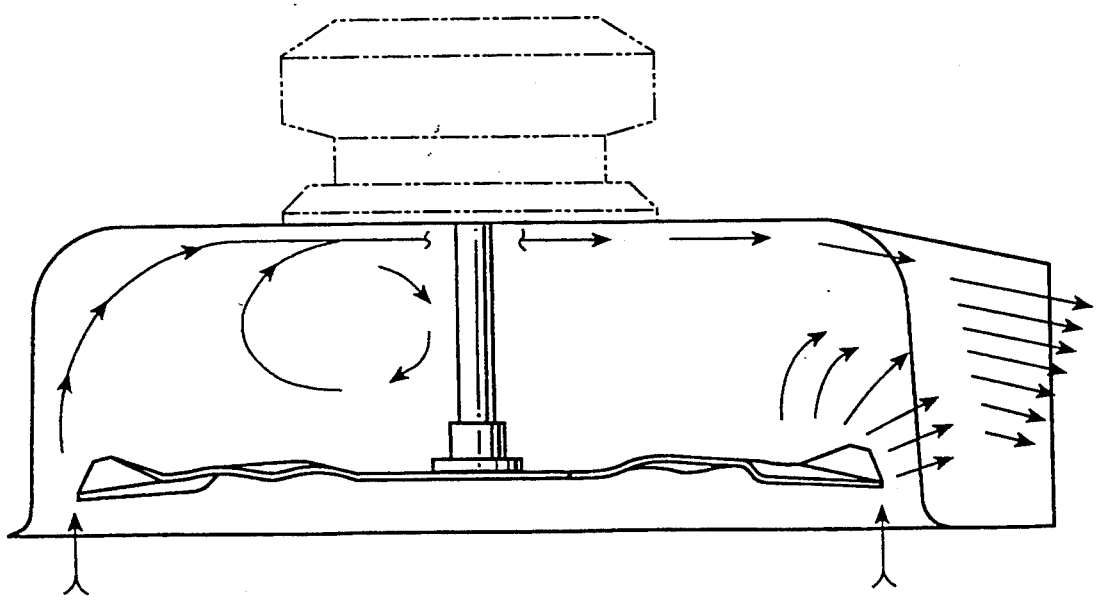
FIG. 8 is a side sectional view similar to FIG. 7, showing the typical air flow pattern of a conventional mower during discharging.

With plug 12 in either the discharge or bag position, the additional air flow by ribs 68 assists in propelling clippings through discharge chute 22 and opening 24. When compared to prior art mulching blades, as illustrated in FIG. 7 and 8, the additional air flow components attributable to ribs 68 cooperate with the more conventional air flow created by upturned corners 66 to provide an extra boost for discharging clippings. This extra air flow results in more efficient bagging and/or discharging by increasing the force with which clippings are expelled from cutting deck 18 and reducing the incidence of clogging of discharge chute 22.

Those skilled in the art will readily understand that ribs 68 are preferably formed by a metal stamping process. When formed as such, ribs 68 provide a further benefit of strengthening cutting blade 14 to prevent unwanted flexing. The additional stability provided by ribs 68 may also contribute to the improved air flow by providing a more even rotational movement for cutting blade 14.

FIGS. 14-22 illustrate a second embodiment of the mulching plug/discharge deflector of the present invention, identified as plug 13. For purposes of this invention, the overall function of plug 13 is substantially identical to that described above for plug 12. The primary difference between plugs 12 and 13 lies in the configuration of the locking means used to secure the plugs in their mulch and discharge positions. The locking means incorporated in plug 13 are described hereinbelow.

Plug 13 is hingedly secured to a pair of brackets 70 which, as best seen in FIGS. 21 and 22, preferably comprise opposite ends of base plate 72 fastened to discharge chute 22. The structural details of the hinging arrangement are illustrated in FIGS. 17-20. As shown in FIG. 21 and 22, base plate 72 is secured to discharge chute 22 by means of screws 74, although it is to be understood that welding, riveting, or virtually any other conventional fastening means may be suitable for the purpose. Plug 13 pivots about shaft 76, the opposite ends of which extend through holes 78 in brackets 70 and are retained within suitable bosses (not shown) formed within plug 13. Torsion spring 80, as shown in FIG. 19, has opposite ends bearing on discharge chute 22 and brace 82, thereby biasing plug 13 in its closed, or mulch, position shown in FIG. 14.

Plug 13 includes a button 84 slidably disposed therein. Secured to button 84 by screw 86 is a flexible locking member 88, which is in the general form of a narrow, flat plate. With plug 13 in its mulch position, shown in FIG. 14, the opposite ends 90 of locking member 88 engage lower notches 92 formed in brackets 70, thereby securing plug 13 in said position and preventing inadvertent opening of discharge opening 24. Upon depression of button 84, as shown in FIG. 21, the central portion of locking member 88 is flexed inwardly, thereby deflecting opposite ends 90 outwardly, out of engagement with lower notches 92. Plug 13 is now free to be rotated upwardly to its discharge position, shown in FIG. 15, at which point button 84 may be released thereby allowing opposite ends 90 to engage upper notches 94 to secure plug 13 in said discharge position.

The central body of plug 13 includes a cavity 96, defined by inner wall 98 and handle 100. It is to be understood that inner wall 98 projects sufficiently within discharge chute 22 to form a mulching surface within cutting deck 18, in the same general manner as described above with respect to inner wall 46 of plug 12. Handle 100 provides a convenient appendage by which the user may grip plug 13 with the fingers of one hand, while depressing button 84 with the thumb of the same hand. The unique configuration of plug 13 therefore provides a more convenient embodiment of the present invention, since it facilitates single handed operation.

Figure 15:
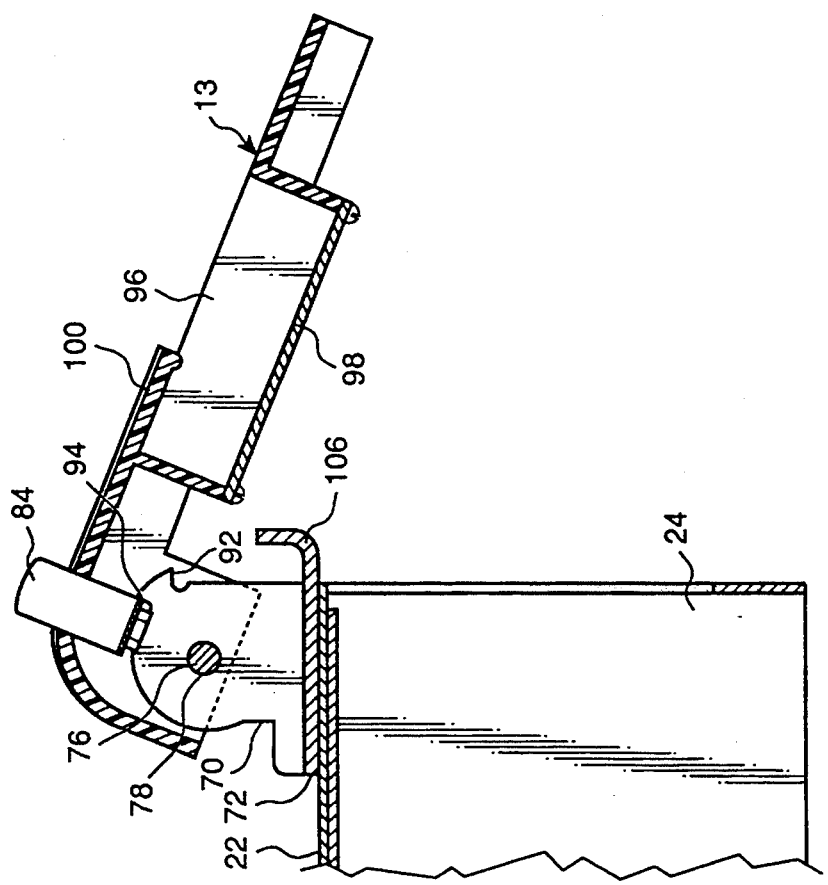
FIG. 15 is a side sectional view of the alternative embodiment shown in FIG. 14, showing the mulching plug/discharge deflector locked in its discharge position.
Figure 14:
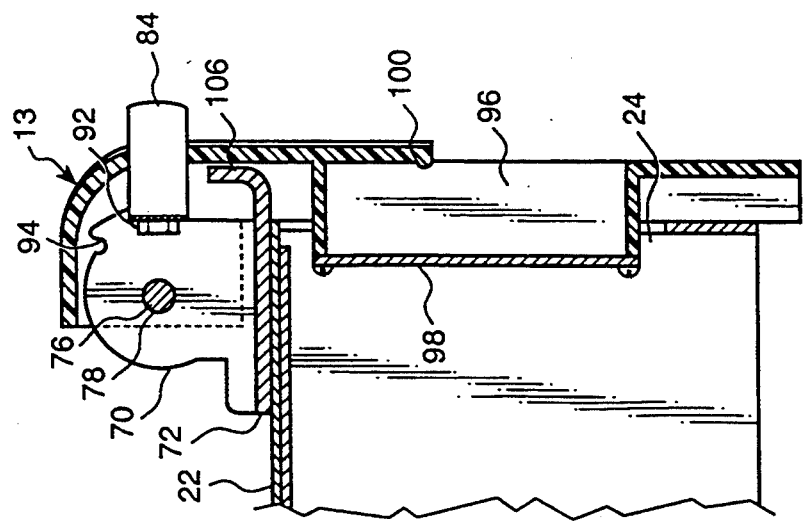
FIG. 14 is a side sectional view of an alternative embodiment of the mulching plug/discharge deflector locked in its mulch position.

When moved to the discharge position as shown in FIG. 15, opposite ends 90 of locking member 88 operatively engage upper notches 94 of brackets 70 to resist the pressure of torsion spring 80 which would otherwise force plug 13 to its closed, or mulch, position. Plug 13 preferably includes angled front extension 102 and rear extension 104 integrally formed with the front and rear edges, respectively, of the face of plug 13. Extensions 102 and 104 enhance the performance of plug 13 in the same general manner as extensions 48 and 50 on plug 12 discussed above. When it is desired to move plug 13 from its discharge position to its bag position, as shown in FIG. 16, the user need only pull upwardly on plug 13, as locking member 88 is adapted to slide over the curved upper portion of brackets 70. Plate 72 preferably includes an upturned lip 106 for engaging the attachment end of a grass catching bag, identified generally in FIG. 16 as bar 108. Upon removal of bar 108, plug 13 will naturally move downward to its discharge position as a result of the force exerted by torsion spring 80. Depression of button 84 is then required to disengage opposite ends 90 of locking member 88 from upper notches 94 to lower plug 13 to its mulch position.

While the principals of an integrated discharge deflector/mulching plug used in combination with an improved cutting blade are disclosed herein, it will be apparent to those skilled in the art that many modifications of the embodiments disclosed herein may be made without departing from the spirit and scope of this patent. Accordingly, the coverage provided by this patent is to be limited only by the following claims.

What is claimed is:

1. A lawn mower adapted to mulch or discharge grass clippings having an engine mounted to the top surface of a cutting deck, with a drive shaft driven by the engine extending downwardly therefrom through a suitable opening in the cutting deck into the cutting chamber defined by said cutting deck, said cutting deck having a peripheral wall with a discharge chute formed therein and a discharge opening at the distal end of said chute, said lawn mower comprising:

a plug member hingedly secured to said top surface of said cutting deck generally adjacent said discharge opening, said plug member being selectively moveable between a plurality of positions including a mulch position and a discharge position, said plug member comprising a central body having an outer face with upper, lower, front and rear edges and a laterally offset inner wall, with a pair of angularly oriented deflector plates extending longitudinally from said front and rear edges of said body, wherein said body of said plug member extends through said discharge opening into said chute and said face effectively blocks said discharge opening when said plug member is in said mulch position, thereby preventing the passage of grass clippings through said discharge opening, said inner wall being disposed within said chute inwardly from said discharge opening adjacent said cutting chamber and being operative to establish a temporary side portion of said cutting chamber, thereby restricting grass clippings from collecting inside said chute during normal mulching operation of said mower, and said inner wall extends laterally outwardly from said discharge opening when said plug is in said discharge position, said inner wall and said deflector plates cooperating to form an effective extension of said chute for directing grass clippings laterally outwardly from said cutting deck during normal discharging operation of said mower.

2. A mower as set forth in claim 1, further comprising:

a cutting element operatively secured to said drive shaft and disposed within said cutting chamber, having means associated therewith for recirculating grass clippings within said cutting chamber when said plug member is in said mulch position, said cutting element further having means associated therewith for expelling said grass clippings through said discharge opening when said plug member is in said discharge position.

3. A mower as set forth in claim 1, further comprising:

locking means associated with said plug member for selectively securing said plug member in either said mulch or discharge position.

4. A mower as set forth in claim 2, wherein said cutting element comprises a central hub securable to said drive shaft and a pair of integrally formed blade sections having distal ends extending in opposite directions horizontally therefrom, each said blade section including:

a leading edge and a trailing edge;

a first cutting surface formed along said leading edge in the vicinity of the distal end of said blade section;

a second cutting surface formed along said leading edge intermediate said distal end and said hub, said second cutting surface and its corresponding segment of said blade section being elevated relative to said first cutting surface, said elevated segment being operative to cause a downdraft upon operation of said mower;

an upturned corner comprising a portion of said distal end and said trailing edge, said upturned corner being operative to cause a first updraft upon operation of said mower; and means for causing a second updraft upon operation of said mower intermediate said second cutting surface and said hub.

5. A mower as set forth in claim 4, wherein:

said means for causing a second updraft comprises an upstanding rib disposed on the top surface of said blade section at least partially intermediate said second cutting surface and said hub.

6. A mower as set forth in claim 5, wherein:

said rib is integrally formed on said blade at least partially on said elevated segment corresponding to said second cutting surface.

7. A mower as set forth in claim 3, wherein said locking means comprise:

a pair of upstanding ears disposed along a portion of said upper edge of said face, each said ear having a transverse hole formed therethrough, said holes being oriented generally parallel to the plane defined by said face;

a pair of brackets secured to said cutting deck, each said bracket being disposed closely adjacent one of said ears and having a plurality of engagement points formed therein; and a generally U-shaped wire member having first and second outwardly-oriented end portions, said first end portion being disposed within said hole in one of said ears, and said second end portion being similarly disposed within said hole is said other ear, thereby securing said wire member to said plug, each said end portion having a distal end extendable through its respective hole in said ear and selectively engageable with said engagement points on said adjacent bracket, said wire member also including a pair of finger-engageable protrusions associated with said first and second end portions, wherein compression of said protrusions operates to retract said end portions from said engagement points, thereby allowing pivotal movement of said plug between said plurality of positions, and release of said protrusions operates to extend said end portions into said engagement points, thereby securing said plug in the selected position.

8. A mower as set forth in claim 7, wherein:

each said bracket includes first and second engagement points, said first engagement point comprising a hole in said bracket for receiving said distal end of one of said end portions of said wire member, thereby securing said plug in said mulch position.

9. A mower as set forth in claim 8, wherein:

said second engagement point comprises a slot in said bracket for receiving said distal end of one of said end portions of said wire bracket, thereby securing said plug in said discharge position.

10. A mower as set forth in claim 9, wherein:

said mower further includes a grass collection bag; and said plug is upwardly pivotable from said discharge position, whereupon said end portions of said wire member become disengaged from said slots in said brackets and said grass collection bag is engageable to said slots.

11. A mower as set forth in claim 3, wherein said locking means comprise:

a pair of brackets secured to said discharge chute, each said bracket having first and second notches formed therein;

a flexible locking member disposed within said plug member, having opposite end portions extending adjacent said brackets; and means for selectively moving said opposite end portions of said locking member into and out of engagement with said first and second notches; wherein said plug is retained in said mulch position when said opposite ends of said locking member are engaged within said first notches, and said plug is retained in said discharge position when said opposite ends of said locking member are engaged within said second notches.

12. A mower as set forth in claim 11, wherein:

said moving means comprise a button, slidably disposed within said plug, having a first end bearing on a intermediate portion of said locking member and a second end extending through a hole in said plug, wherein depression of said button causes translation of said intermediate section relative to said opposite ends of said locking member and corresponding bending thereof, thereby deflecting said opposite ends out of engagement with said first or second notches.

13. A mower as set forth in claim 12, further comprising:

a finger engaging appendage disposed beneath said button, wherein a user of said mower can grasp said appendage with the fingers of one hand and depress said button with the thumb of the same hand, and pull upwardly on said appendage to rotate said plug from said mulch position to said discharge position.

14. A mower as set forth in claim 11, wherein:

said brackets further include curved upper portions adjacent said second notches, said opposite ends of said locking member bearing on said upper portions when engaged with said second notches and slidable thereon so that said plug is moveable to a grass collecting position from said discharge position without further operation of said moving means.

15. A mower as set forth in claim 11, wherein:

said brackets are integrally formed at opposite ends of a plate and at right angles thereto, said plate being secured to said discharge chute and having an upturned lip formed thereon for engaging a grass collection bag.

16. A lawn mower adapted to mulch or discharge grass clippings having an engine mounted to the top surface of a cutting deck, with a drive shaft driven by the engine extending downwardly therefrom through a suitable opening in the cutting deck into the cutting chamber defined by said cutting deck, said cutting deck having a peripheral wall with a discharge chute formed therein and a discharge opening at the distal end of said chute, said lawn mower comprising:

means for plugging said discharge opening when said mower is used for mulching; and a cutting blade disposed within said cutting chamber operatively secured to said drive shaft, said blade comprising a hub securable to said drive shaft and a pair of opposed blade sections extending therefrom, each said blade section comprising:

a leading edge and a trailing edge;

a first cutting surface formed along said leading edge in the vicinity of the distal end of said blade section;

a second cutting surface formed along said leading edge intermediate said distal end and said hub, said second cutting surface and its corresponding segment of said blade section being elevated relative to said first cutting surface, said elevated segment being operative to cause a downdraft upon operation of said mower;

an upturned corner comprising a portion of said distal end and said trailing edge, said upturned corner being operative to cause a first updraft upon operation of said mower; and means for causing a second updraft upon operation of said mower intermediate said second cutting surface and said hub.

17. A mower as set forth in claim 16, wherein:

said means for causing a second updraft comprises an upstanding rib disposed on the top surface of said blade section at least partially intermediate said second cutting surface and said hub.

18. A mower as set forth in claim 17, wherein:

said rib is integrally formed on said blade at least partially on said elevated segment corresponding to said second cutting surface.

19. A rotary mower adapted for mulching and discharging grass clippings, comprising:

a cutting deck having a chute formed therein, said chute having a discharge opening in its distal end, said cutting deck defining a cutting chamber;

an engine mounted to said cutting deck, having a drive shaft extending through a suitable opening in said cutting deck into said cutting chamber;

a plug member hingedly secured to said cutting deck generally adjacent said discharge opening, said plug member being selectively moveable between a plurality of positions including a mulch position and a discharge position, said plug member comprising a central body having an outer face with upper, lower, front and rear edges and a laterally offset inner wall, with a pair of angularly oriented deflector plates extending longitudinally from said front and rear edges of said body, wherein said body of said plug member extends through said discharge opening into said chute and said face effectively blocks said discharge opening when said plug member is in said mulch position, thereby preventing the passage of grass clippings through said discharge opening, said inner wall being disposed within said chute inwardly from said discharge opening adjacent said cutting chamber and being operative to establish a temporary side portion of said cutting chamber, thereby restricting grass clippings from collecting inside said chute during normal mulching operation of said mower, and said inner wall extends laterally outwardly from said discharge opening when said plug is in said discharge position, said inner wall and said deflector plates cooperating to form an effective extension of said chute for directing grass clippings laterally outwardly from said cutting deck during normal discharging operation of said mower; and a cutting blade disposed within said cutting chamber operatively secured to said drive shaft, said blade comprising a hub securable to said drive shaft and a pair of opposed blade sections extending therefrom, each said blade section comprising:

a leading edge and a trailing edge;

a first cutting surface formed along said leading edge in the vicinity of the distal end of said blade;

a second cutting surface formed along said leading edge intermediate said distal end and said hub, said second cutting surface and its corresponding segment of said blade section being elevated relative to said first cutting surface, said elevated segment portion being operative to cause a downdraft upon operation of said mower;

an upturned corner comprising a portion of said distal end and said trailing edge, said upturned corner being operative to cause a first updraft upon operation of said mower; and an upstanding rib integrally formed on said blade section at least partially intermediate said second cutting surface and said hub, operative to cause a second updraft upon operation of said mower intermediate said second cutting surface and said hub.

* * * * *